United States Patent
Campbell et al.

(10) Patent No.: US 6,691,417 B2
(45) Date of Patent: *Feb. 17, 2004

(54) PRUNER ATTACHMENT APPARATUS FOR A POWER TOOL

(75) Inventors: David C. Campbell, Bel Air, MD (US); Angela M. Waldrop, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/103,421

(22) Filed: Mar. 21, 2002

(65) Prior Publication Data

US 2002/0095799 A1 Jul. 25, 2002

Related U.S. Application Data

(63) Continuation-in-part of application No. 09/557,197, filed on Apr. 21, 2000.

(51) Int. Cl.⁷ .................. B27B 11/04; B23D 51/04
(52) U.S. Cl. .................. 30/371; 30/92; 30/96; 30/374; 30/378
(58) Field of Search .................. 30/371, 378, 96, 30/372, 373, 374, 375, 376, 377, 92

(56) References Cited

U.S. PATENT DOCUMENTS

| | | | |
|---|---|---|---|
| 825,836 A | 7/1906 | Hornquist | 30/372 |
| 2,645,011 A | 7/1953 | Otis | 30/378 |
| 3,181,239 A | 5/1965 | Skok | 30/378 X |
| 3,360,021 A | 12/1967 | Mejia | 30/375 |
| 3,657,813 A | 4/1972 | Knight | 30/166 |
| 3,755,896 A | 9/1973 | Tommerup | 30/372 |
| 3,834,019 A | 9/1974 | Smeltzer et al. | 30/378 X |
| 4,272,889 A | 6/1981 | Scott et al. | 30/371 |
| 4,419,904 A | 12/1983 | Albury | 74/44 |
| 4,437,237 A | 3/1984 | Ducret | 30/378 X |
| 4,566,188 A | 1/1986 | Wilson | 30/166 A |
| 4,747,212 A | 5/1988 | Cavdek | 30/374 X |
| 4,945,641 A | 8/1990 | Miller et al. | 30/378 X |
| 4,991,298 A | 2/1991 | Matre | 30/392 |
| 5,099,705 A | 3/1992 | Dravnieks | 74/50 |
| 5,205,043 A | 4/1993 | Batt et al. | 30/393 |
| 5,398,417 A | 3/1995 | Quirijnen | 30/394 |
| 5,450,925 A | 9/1995 | Smith et al. | 184/5 |
| 5,632,089 A | 5/1997 | Sakamoto et al. | 30/372 X |
| 5,724,742 A | 3/1998 | Grabowski | 30/392 |
| 5,806,187 A | 9/1998 | Ducret | 30/371 X |
| 5,926,961 A | 7/1999 | Uhl | 30/296.1 |
| 6,067,716 A | 5/2000 | Carter | 30/378 X |
| 6,412,179 B1 * | 7/2002 | Ende | 30/374 |
| 6,449,851 B1 * | 9/2002 | Bone et al. | 30/372 |
| 6,484,409 B2 * | 11/2002 | Campbell et al. | 30/371 |

FOREIGN PATENT DOCUMENTS

JP  4-8420  1/1992

* cited by examiner

Primary Examiner—Charles Goodman
(74) Attorney, Agent, or Firm—Harness, Dickey & Pierce, P.L.C.

(57) ABSTRACT

A pruner attachment apparatus includes a body releasably attachable to a shoe of a power tool of the type having a reciprocating saw blade. The body includes a front face for engaging a workpiece. The pruner attachment apparatus further includes a hook member for engaging the workpiece. The hook member is laterally spaced from the saw blade of the tool and is mounted to the body for movement along a path between a first position and a second position. The path includes an upper curvilinear portion configured such that movement of the hook member from the first position to the second position positions the hook member completely behind an imaginary line in a common plane with the front face. A biasing mechanism biases the hook member to the second position.

20 Claims, 6 Drawing Sheets

PRUNER ATTACHMENT APPARATUS FOR A POWER TOOL

CROSS-REFERENCE TO RELATED APPLICATION

This application is a continuation-in-part application of U.S. Ser. No. 09/557,197 filed Apr. 21, 2000.

FIELD OF THE INVENTION

The present invention generally pertains to power tools. More particular, the present invention relates to a pruner attachment apparatus for a power tool. More specifically, but without restriction to the particular embodiment and/or use which is shown and described for purposes of illustration, the present invention relates to a pruner attachment apparatus releasably attachable to a shoe of a reciprocating saw.

BACKGROUND OF THE INVENTION

Power reciprocating saws include jigsaws and other reciprocating saws generally referred to in the trade as "recip" saws. These saws incorporate reciprocating drive shafts for driving saw blades. The saw blades are driven along a predetermined path so as to provide either a rectilinear or an orbital cutting action. An exemplary reciprocating saw is shown and described in commonly assigned U.S. Pat. No, 5,940,977 which is hereby incorporated by reference as if fully set forth herein.

Efficient cutting with a power reciprocating saw typically requires the workpiece to be secured. If the workpiece is not adequately secured, it may move relative to the saw in response to reciprocation of the saw blade. For most applications, the workpiece can be adequately secured with conventional clamping and the like. It is not practical or perhaps possible to secure branches, smaller size tree limbs or other similarly shaped objects for cutting with a reciprocating saw.

SUMMARY OF THE INVENTION

It is a general object of the present invention to provide an attachment apparatus for a power tool for cutting branches, tree limbs and the like.

It is related object of the present invention to provide a pruner attachment apparatus which can be quickly, easily and securely attached to a power tool having a reciprocating saw blade.

In one particular form, the present invention includes a body releasably attachable to a shoe of a power tool of the type having a reciprocating saw blade. The body includes a front face for engaging a workpiece. The pruner attachment apparatus further includes a hook member for engaging the workpiece. The hook member is laterally spaced from the saw blade of the tool and is mounted to the body for movement along a path between a first position and a second position. The path includes an upper curvilinear portion configured such that movement of the hook member from the first position to the second position positions the hook member completely behind an imaginary line in a common plane with the front face. A biasing mechanism biases the hook member to the second position.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
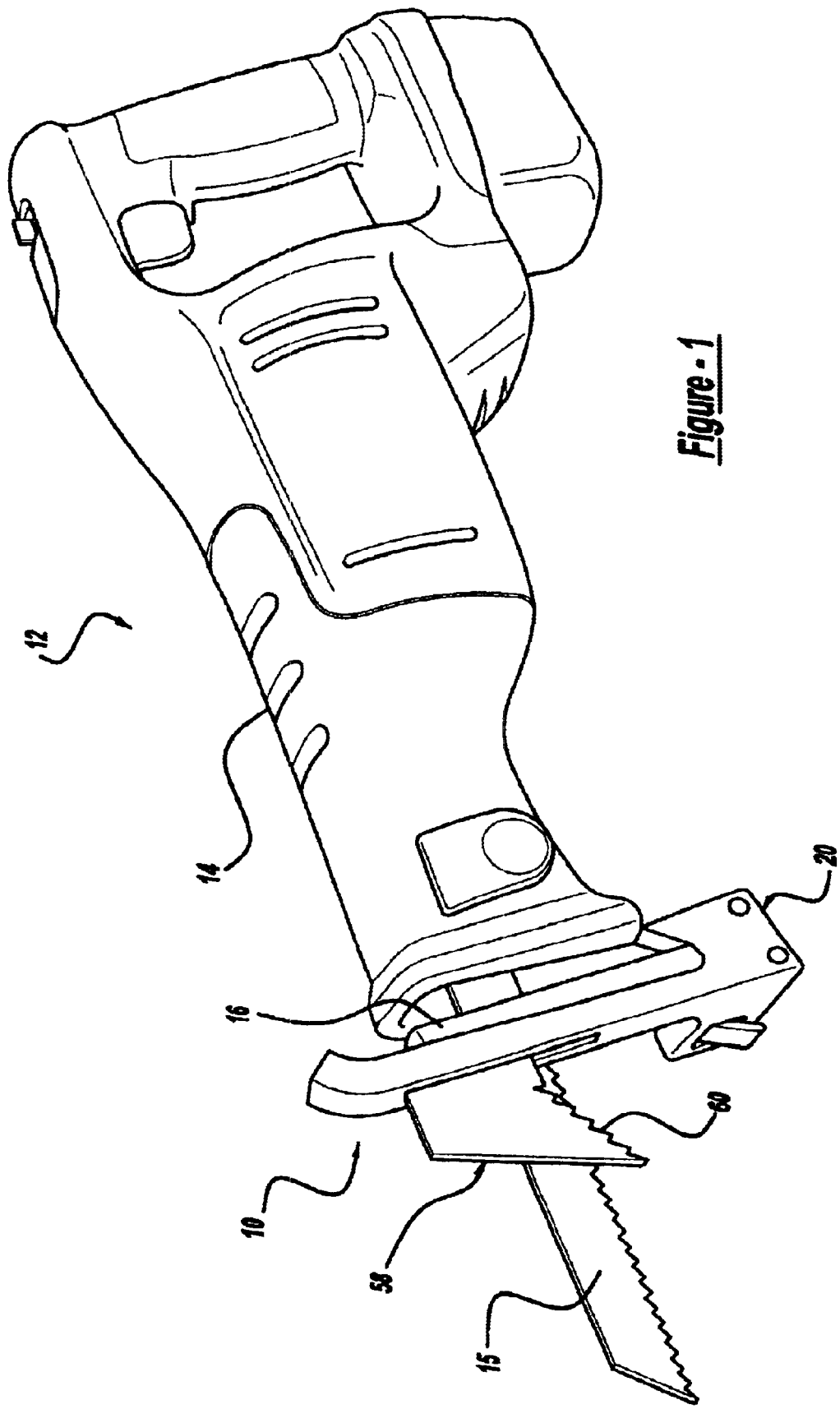
FIG. 1 is an environmental view illustrating a pruner attachment apparatus constructed in accordance with the teachings of a first preferred embodiment of the present invention, the pruner attachment apparatus shown operatively attached to a power tool having a reciprocating saw blade.

The following description of the preferred embodiment(s) is merely exemplary in nature and is in no way intended to limit the invention, its application, or uses.

With initial reference to FIGS. 1–6 of the drawings, a pruner attachment apparatus constructed in accordance with the teachings of a first preferred embodiment of the present invention is illustrated and generally identified at reference numeral 10. The pruner attachment apparatus 10 is shown throughout the drawings operatively associated with a power tool 12. In the exemplary embodiment, the power tool 12 is a reciprocating saw. However, it will become apparent to those skilled in the art that the subject invention may be adapted for use with other types of tools having reciprocating saw blades.

The power tool 12 conventionally includes a body 14 and a saw blade 15 interconnected to the body 14 for reciprocating motion. The power tool 12 further includes a shoe 16. The shoe 16 is adapted to normally engage a workpiece when the power tool 12 is used without the pruner attachment apparatus 10 and is pivotally interconnected to the body 14 through a pair of mounting brackets 18 in a conventional manner.

The apparatus 10 of the first preferred embodiment of the present invention is illustrated to generally include a mounting member or frame 20. The frame 20 is attachable to the shoe 16 of the power tool 12. In the preferred embodiment, the frame 20 is releasably attachable to the shoe 16. In one application, the frame 20 is unitarily constructed of an injection molded plastic. However, those skilled in the art will readily appreciate that other materials may be alternatively used.

Figure 2:
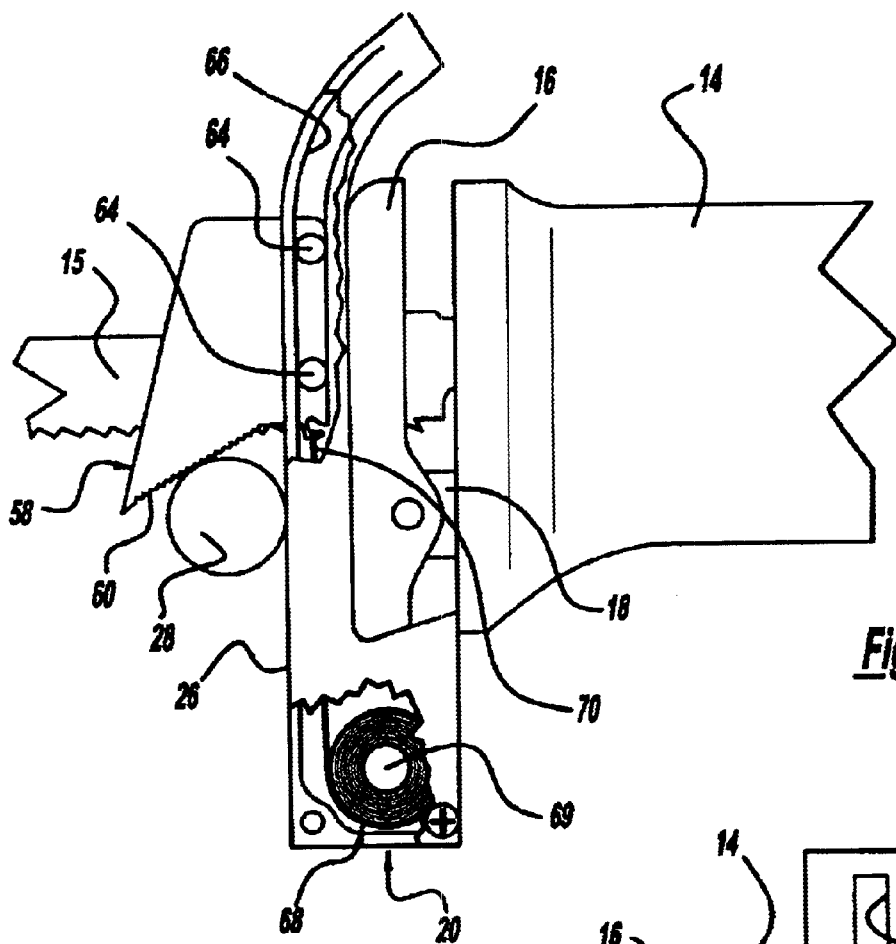
FIG. 2 is right side view of the pruner attachment apparatus and a portion of the power tool of FIG. 1 operatively associated with a tree branch, the pruner attachment apparatus shown partially cut-away.
Figure 3:
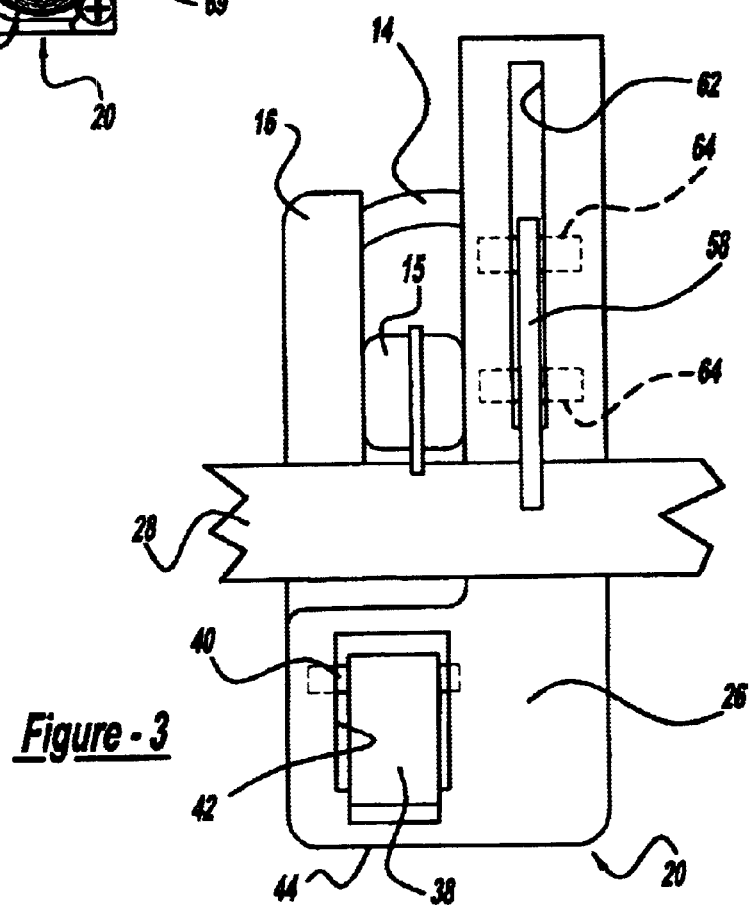
FIG. 3 is a front view of the pruner attachment apparatus and a power tool of FIG. 1 shown operatively associated with a tree branch.
Figure 4:
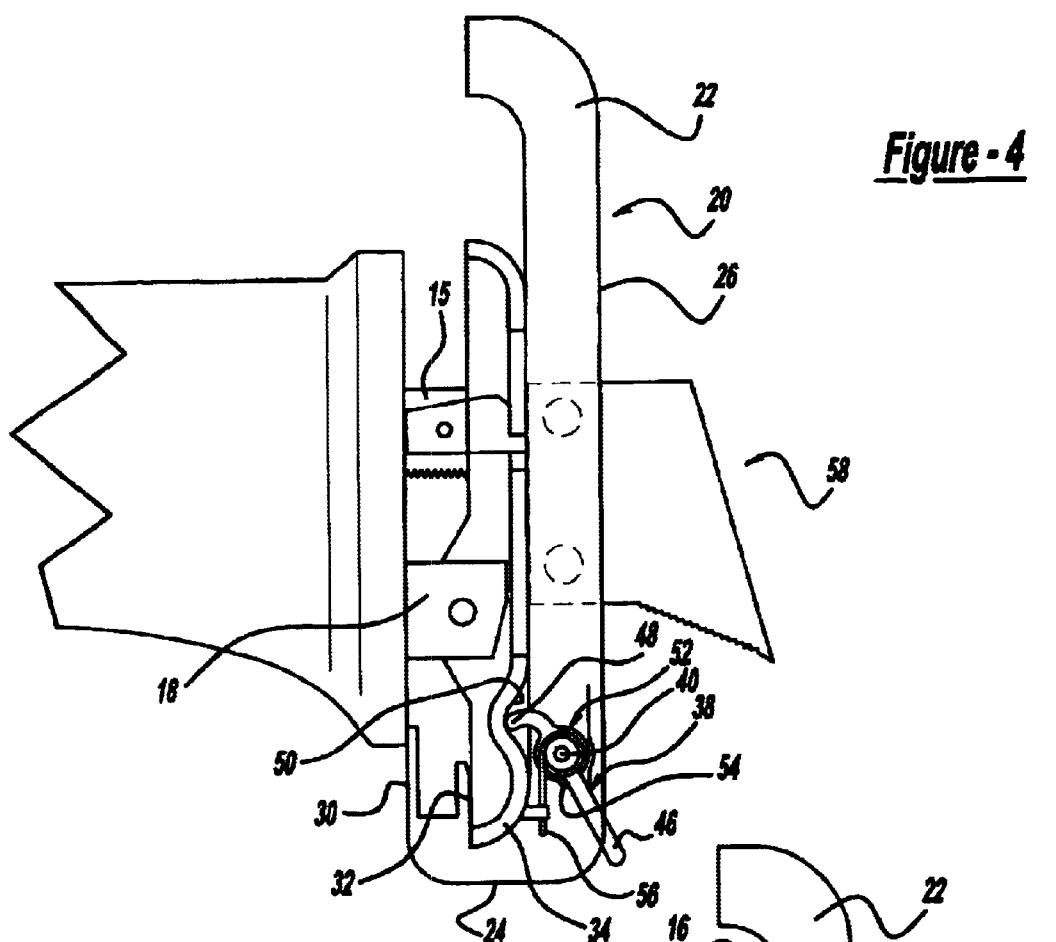
FIG. 4 is left side view of the pruner attachment apparatus and a portion of the power tool of FIG. 1 shown partially cut-away.
Figure 5:
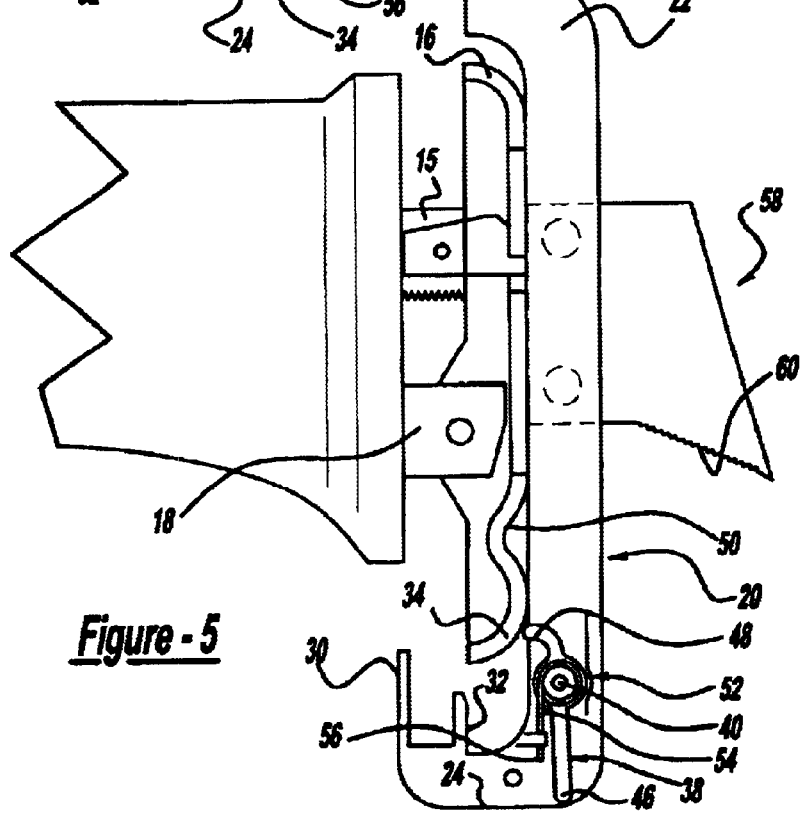
FIG. 5 is a view similar to FIG. 4, illustrating the pruner attachment apparatus prior to complete attachment to the shoe of the power tool.
Figure 6:
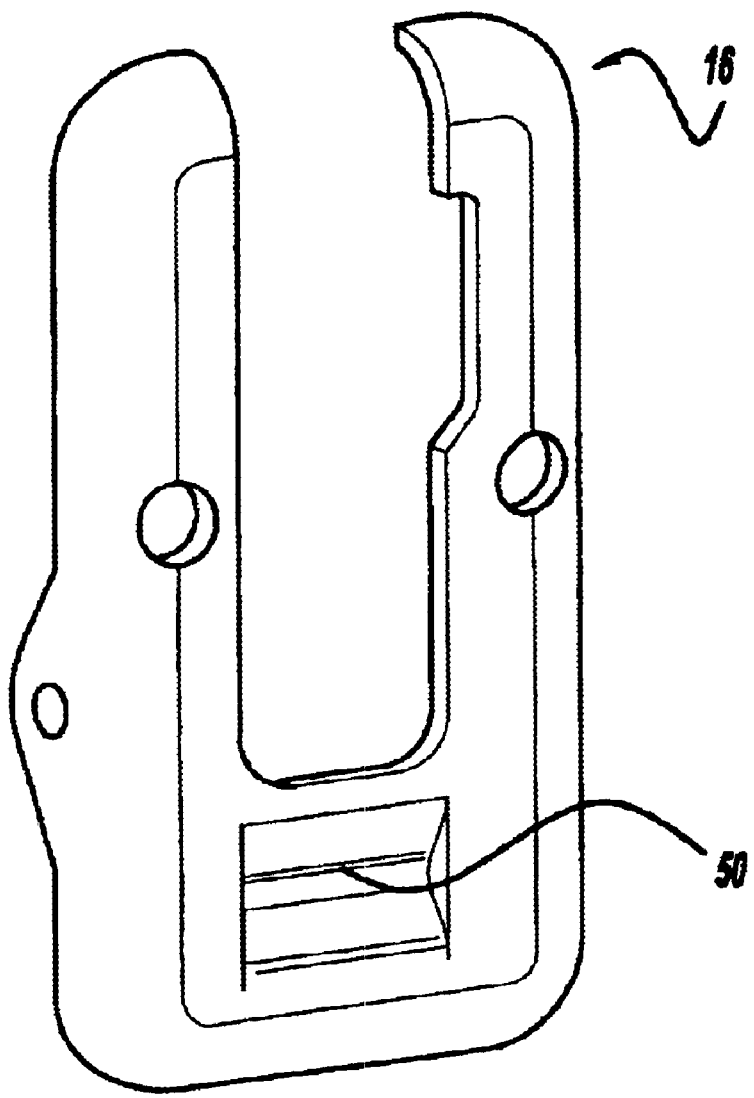
FIG. 6 is a perspective view of a shoe of the power tool illustrated in FIG. 1.

As shown most particularly in the side views of FIGS. 4 and 5, the frame 20 includes a main body portion 22 and a rearwardly extending portion 24. The main body portion 22 includes a front face 26 for engaging a workpiece 28. In FIGS. 2 and 3, the workpiece 28 is illustrated as a branch, small tree limb or the like. The apparatus 10 of the present invention may also assist in the cutting of small pieces of lumber, pvc tubing, metal pipe and any other similarly sized items of a material suitable for cutting with a reciprocating saw blade.

The rearwardly extending portion 24 includes a flange 30 which extends parallel to main body portion 22. The flange 30 cooperates with the main body portion 22 to define an opening 32 for receiving a lower portion 34 of the shoe 16. The flange 30 is insertable between the body 14 of the power tool 12 and the shoe 16 to prevent movement of the shoe 16 relative to the body 14.

The apparatus of the first preferred embodiment of the present invention 10 further includes a lever 38 for securing the apparatus 10 to the shoe 16. The lever 38 is shown particularly in FIGS. 4 and 5 to be mounted for rotation about a pivot pin 40. The pivot pin 40 is carried by the frame 20 and is oriented generally perpendicular to an axis defined by the saw blade 15. The lever 38 is substantially disposed within an opening 42 defined in a laterally extending portion 44 of the frame 20.

The lever 38 includes a lower end 46 and an upper end 48. The lower end 46 is adapted to be manually engaged. The upper end 48 inwardly curves and engages a pocket 50 provided in the shoe 16. The pocket 50 is shown most particularly in FIG. 6.

In the embodiment illustrated, the lever 38 is biased in a counterclockwise direction (as shown in FIGS. 4 and 5). In one application, the lever 38 is biased by a torsion spring 52 which wraps around the pivot pin 40. One end 54 of the torsion spring 52 engages the upper end 48 of the lever 38 and the other end 56 is opposed by the main body portion 22 of the frame 20.

During attachment of the apparatus 10 to the tool 12, the frame 20 is translated upwardly over the shoe 16. The spring-loaded lever 38 slides over the forward-lower surface of the shoe 16 until the upper end 48 or hook portion reaches and engages the pocket 50. Upon reaching the pocket 50, the lever 38 rotates counter-clockwise to thereby securing the frame 20 to the shoe 16.

The apparatus 10 of the first preferred embodiment of the present invention is shown to further include a hook member 58 having a plurality of teeth 60 for engaging the workpiece 28 and securing the workpiece 28 relative to the front face 26. In the preferred embodiment, the hook member 58 is laterally spaced from the blade 15 and is disposed within a vertically extending slot 62 in the frame 20. The hook member 58 is interconnected to the frame 20 by a pair of pins 64 which ride in a substantially vertical channel 66 formed in the frame 20. The hook member 58 is permitted to move between a first or upper position and a second or lower position. The upper position of the hook member 58 is shown in FIG. 1. The lower position of the hook member 58 is shown in FIGS. 2 and 3, for example. In the exemplary embodiment illustrated, the path along which the hook member 58 travels includes an upper portion which is curvilinear.

The hook member 58 is normally biased to its lower position. In one application, the hook member 58 is downwardly biased by a clock spring 68. The clock spring 68 is shown wound around a post 70 carried by the frame 20 and includes a free end 70 engaged with the hook member 58. The clock spring 68 applies a biasing force to the hook member 58 which remains relatively constant along a length of travel of the hook member 58. Preferably, the clock spring 68 is completely concealed within the frame 20. Downward biasing of the hook member 58 allows the hook member 58 to restrain workpieces 28 of different sizes, and also allows the hook member 58 to move upwardly and out of the way during the cutting motion as the saw blade 15 moves downwardly through the workpiece 28.

Figure 7:
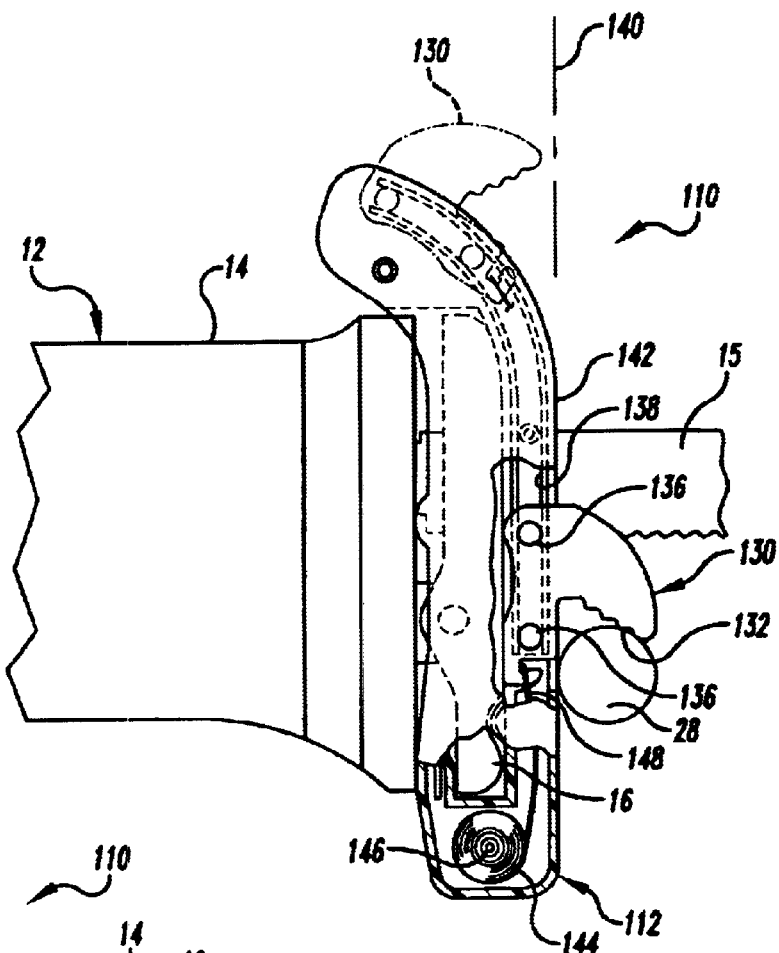
FIG. 7 is a right side view of a pruner attachment apparatus constructed in accordance with the teachings of a second preferred embodiment of the present invention, the pruner attachment apparatus shown partially cut-away and in operative association with a workpiece, the hook member shown in a lower or first position in solid lines and further shown in an upper or second position in hidden lines.
Figure 8:
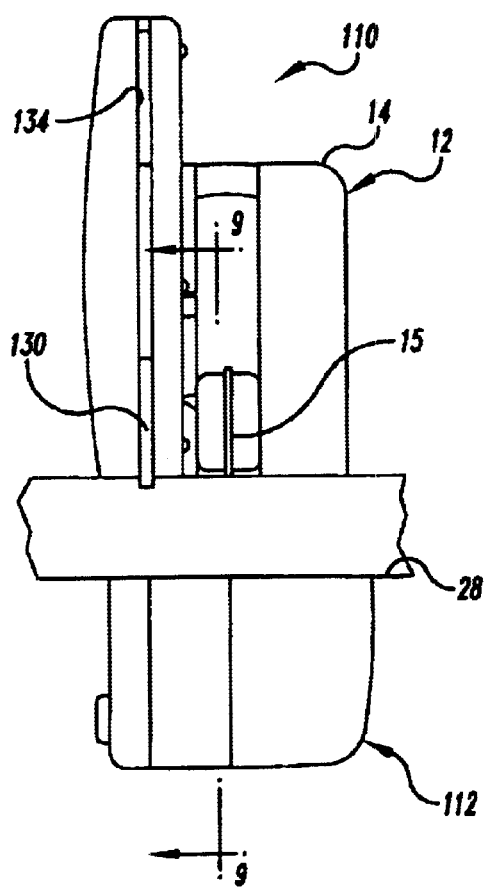
FIG. 8 is a front view of the pruner attachment according to the second preferred embodiment of the present invention again shown operatively associated with a workpiece, the blade illustrated in its lower position.
Figure 9:
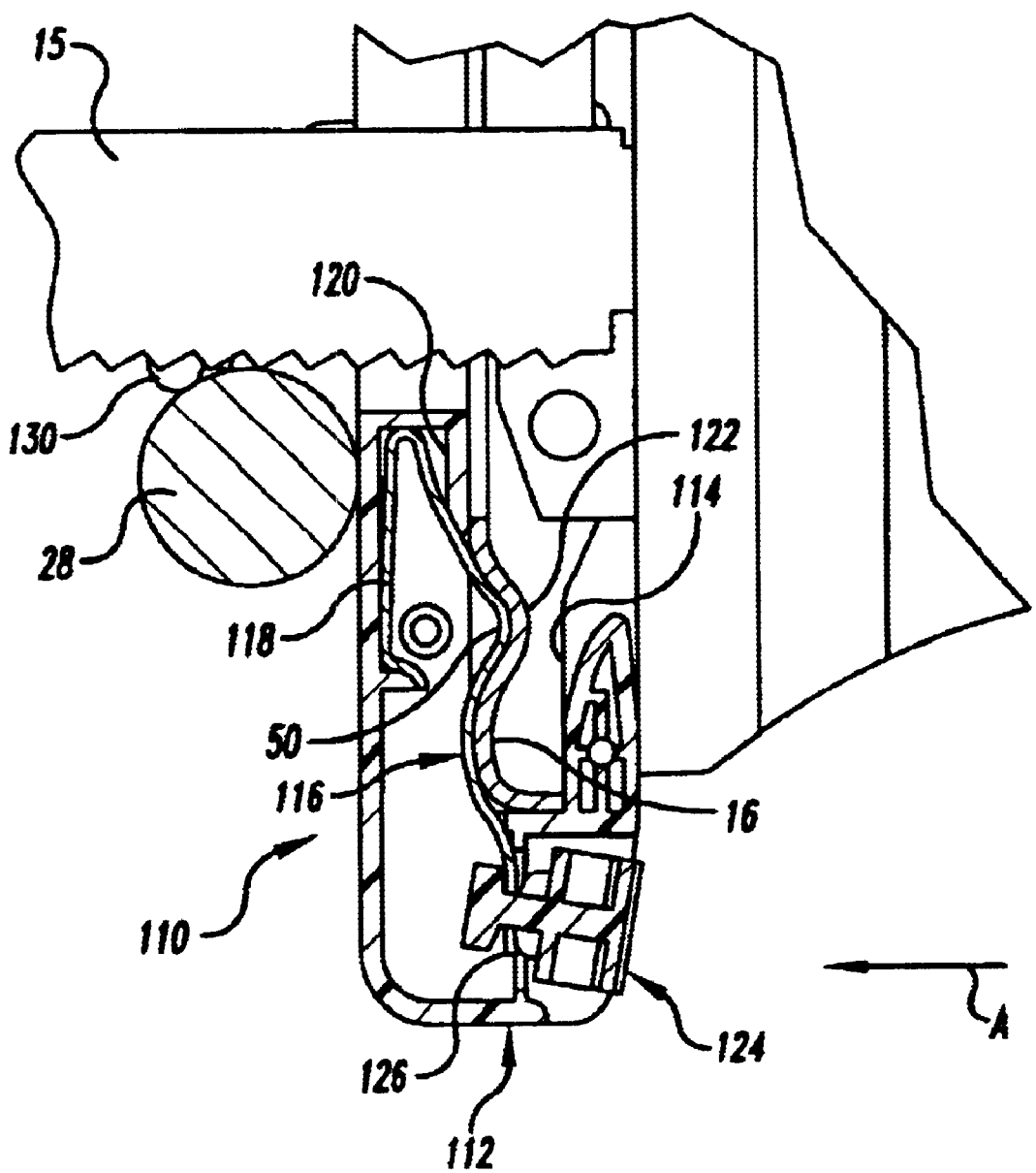
FIG. 9 is a cross-sectional view taken along the line 9—9 of FIG. 8.

Turning now to FIGS. 7 through 9, a pruner attachment apparatus constructed in accordance with the teachings of a second preferred embodiment of the present invention is illustrated and generally identified at reference numeral 110. As with the first preferred embodiment, the pruner attachment apparatus 110 is shown operatively associated with a power tool in the form of a reciprocating saw 12 having a body 14, a saw blade 15 and a shoe 16. The pruner attachment apparatus is shown operatively associated with the workpiece 28.

The apparatus 110 of the second preferred embodiment of the present invention is illustrated to generally include a body or frame 112 attachable to the shoe 16 of the tool 12. The body 112 is preferably releasably attachable to the shoe 16 and constructed of an injection molded plastic or other suitable material.

To facilitate releasable attachment of the body 112 to the shoe 16, the body 112 defines an opening 114 for receiving a lower end of the shoe 16. The lower end of the shoe 16 is retained within the opening 114 by a spring 116. The spring 116 includes an upper end 118 retained within a generally rectangular cavity 120 of the body 112. Additionally, the spring 116 includes a convexly curved portion 122 which is matingly received within the pocket 50 defined by the shoe 16. The spring 116 is normally biased into engagement with the shoe 16. Explaining further, the spring 116 is movable between an engaged position (shown in FIG. 9) and a disengaged position (not particularly shown).

Initial insertion of the lower end of the shoe 16 into the opening 114 resiliently displaces the spring 116 from its engaged position to its disengaged position. Such displacement facilitates further insertion of the lower end of the shoe 16. Upon complete insertion, the convex portion 114 of the spring 116 is received within the pocket 50 of the shoe 16 such that the spring 116 resiliently returns to its engaged position to retain the apparatus 110 to the shoe 16.

Removal of the apparatus 110 from the shoe 16 is facilitate by a manually operated button 124. The manually operated button 124 is carried by a lower end 126 of the spring 116. Inward depression of the manually operated button 124 in a direction generally indicated by arrow A (see FIG. 9) moves the spring 116 from its engaged position to its disengaged position by deflecting the lower end 126 of the spring 116 against its inherent resiliency. This motion of the spring 116 serves to separate the convex portion 122 of the spring 116 from the pocket 50. In this manner, the apparatus 110 is then free to be removed from the tool 12.

The apparatus 110 of the second preferred embodiment of the present invention is further shown to include a hook member 130 shown to preferably include a plurality of teeth 132 for engaging the workpiece 28. As with the first preferred embodiment, the hook member 130 is laterally spaced from the blade 15 and disposed within a vertically extending slot 134 (see FIG. 8) defined by the body 112. The hook member 130 is interconnected to the body 112 by a pair of pins 136 that ride in a channel 138 formed in the body 112.

The hook member 130 is permitted to move between a first or upper position and a second or lower position. The upper position of the hook member 130 is illustrated in FIG. 7. The lower position of the hook member 130 is shown in FIG. 8. Preferably, the path defined by the slot 138 and along which the hook member 130 travels includes an upper portion (shown particularly in FIG. 7) which is curvilinear in shape. In this manner, when the hook member 130 is at the upper end of its travel (as shown in FIG. 7), the hook member 130 is disposed completely behind an imaginary line 140 that is in a common plane with a front face 142 of the body 112.

The hook member 130 is normally biased to its lower position. In the embodiment illustrated, the hook member 130 is downwardly biased by a clock spring 144. The clock spring 144 is shown wrapped round around a post 146 carried by the body 112 and includes a free end 148 engaged with the hook member 130. Distinct from a coil spring, the clock spring 144 applies a biasing force to urge the hook member 130 downward which remains relatively constant along the length of travel of the hook member 130. Preferably, the clock spring 130 is completely concealed within the body 112. Downward biasing of the hook member 130 allows the hook member 132 to restrain workpieces 28 of different sizes and also hook member 130 to move upwardly and outwardly during the cutting motion as the saw blade 15 moves downwardly through the workpiece 28.

In use, the operator of the tool 12 attaches the apparatus 110 in the manner discussed above. The workpiece 28 is abutted against the front surface 142 of the body 112 and engages the hook member 130 in its lower position. While the blade 15 of the tool 12 is reciprocating, the tool 12 is translated downwardly against the bias of the coil spring 144. Continued downward translation of the tool 12 brings the workpiece 28 into contact with the reciprocating blade 15 for cutting. At a point which the blade 15 completely passes through the workpiece 28, the hook member 130 travels along the upper curvilinear portion of the channel 138. Through continued downward translation of the tool 12, the workpiece 28 moves the hook member 130 further upward and rearward. Ultimately, the hook member 130 is rearwardly displaced completely behind the imaginary line 140 in the same plane as the front face 142. This rearward movement of the hook member 130 facilitates disengagement of the workpiece 28 solely through continued downward translation of the tool 12.

While the invention has been described in the specification and illustrated in the drawings with reference to first and second preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A pruner attachment apparatus for a power tool having a tool body, a shoe extending from the tool body, and a saw blade interconnected to the tool body for reciprocating motion, the pruner attachment apparatus comprising:

an attachment body releasably attachable to the shoe, the attachment body including a front face for engaging a workpiece; and a hook member for engaging the workpiece, the hook member mounted to the attachment body for movement along a path between a first position and a second position, the path including an upper portion configured such that movement of the hook member from the first position to the second position positions the hook member completely behind an imaginary line in a common plane with the front face;

wherein the upper portion of the path is curvilinear and the path further includes a lower linear portion.

2. The pruner attachment apparatus for a power tool of claim 1, wherein the path is defined by the attachment body.

3. The pruner attachment apparatus for a power tool of claim 1, wherein the attachment body includes a pair of channels defining the path.

4. The pruner attachment apparatus for a power tool of claim 3, wherein the hook member is slidably interconnected to the pair of channels by at least one pin.

5. The pruner attachment apparatus for a power tool of claim 1, further comprising a biasing mechanism biasing the hook member to the second position.

6. The pruner attachment apparatus for a power tool of claim 1, wherein the hook member is laterally spaced from the blade.

7. A pruner attachment apparatus for a power tool having a body, a shoe extending from the body, and a saw blade interconnected to the body for reciprocating motion, the pruner attachment apparatus comprising:

a frame releasably attached to the shoe; and a hook member carried by the frame for movement between a first position and a second position, the hook member translatable from the first position to the second position upon concurrent advancement of the saw blade through a workpiece, the hook member translates relative to the frame along a predetermined path, the predetermined path including a linear portion and a curvilinear portion.

8. The pruner attachment apparatus for a power tool of claim 7, wherein the frame includes a pair of channels defining the predetermined path.

9. The pruner attachment apparatus for a power tool of claim 8, wherein the hook member is slidably interconnected to the pair of channels by at least one pin.

10. The pruner attachment apparatus for a power tool of claim 8, further comprising a biasing mechanism biasing the hook member to the second position.

11. The pruner attachment apparatus for a power tool of claim 7, wherein the hook member non-rotatably translates along the linear portion of the path.

12. The pruner attachment apparatus for a power tool of claim 7, further comprising a biasing mechanism biasing the hook member to the second position.

13. A power tool comprising:

a body;

a shoe extending from the body;

a saw blade interconnected to the body for reciprocating motion;

a frame releasably attached to the shoe, the frame defining an opening; and a hook member carried by the frame for movement between a first position and a second position, the hook member translatable from the first position to the second position upon concurrent advancement of the saw blade through a workpiece;

a lower end of the shoe retained within the opening by a spring, the spring movable between a first position engaged with the shoe and a second position spaced from the shoe by a manually operated button carried by the spring.

14. The power tool of claim 13, wherein the spring is normally biased into engagement with the shoe.

15. The power tool of claim 13, wherein the spring includes a convexly curved portion received within a packet defined by the shoe.

16. The power tool of claim 13, wherein the manually operated button is movable in a direction generally parallel to the saw blade.

17. A pruner attachment apparatus for a power tool having a tool body, a shoe extending from the tool body, and a saw blade interconnected to the tool body for reciprocating motion, the pruner attachment apparatus comprising:

an attachment body releasably attachable to the shoe, the attachment body including a front face for engaging a workpiece; and a hook member for engaging the workpiece, the hook member mounted to the attachment body for movement along a path between a first position and a second position, the path including an upper portion configured such that movement of the hook member from the first position to the second position positions the hook member completely behind an imaginary line in a common plane with the front face;

wherein the attachment body includes a pair of channels defining the path, the upper portion of the path being curvilinear.

18. The pruner attachment apparatus for a power tool of claim 17, wherein the hook member is slidably interconnected to the pair of channels by at least one pin.

19. The pruner attachment apparatus for a power tool of claim 17, further comprising a biasing mechanism biasing the hook member to the second position.

20. The pruner attachment apparatus for a power tool of claim 17, wherein the hook member is laterally spaced from the blade.

* * * * *

UNITED STATES PATENT AND TRADEMARK OFFICE
CERTIFICATE OF CORRECTION

PATENT NO. : 6,691,417 B2
DATED : February 17, 2004
INVENTOR(S) : David C. Campbell et al.

It is certified that error appears in the above-identified patent and that said Letters Patent is hereby corrected as shown below:

<u>Column 6,</u>
Line 41, after "path" insert -- being defined by at least one channel in the frame, the at least one channel --.

Signed and Sealed this

Eighteenth Day of May, 2004

JON W. DUDAS
*Acting Director of the United States Patent and Trademark Office*